(12) United States Patent
Liu et al.

(10) Patent No.: US 8,587,733 B2
(45) Date of Patent: *Nov. 19, 2013

(54) DISPLAY DEVICE

(75) Inventors: Liang Liu, Beijing (CN); Chen Feng, Beijing (CN); Li Qian, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 314 days.

This patent is subject to a terminal disclaimer.

(21) Appl. No.: 12/894,514

(22) Filed: Sep. 30, 2010

(65) Prior Publication Data
US 2011/0304800 A1 Dec. 15, 2011

(30) Foreign Application Priority Data
Jun. 15, 2010 (CN) .......................... 2010 1 0201274

(51) Int. Cl.
*G02F 1/1335* (2006.01)
*G02F 1/1343* (2006.01)

(52) U.S. Cl.
USPC .............................. 349/12; 349/96; 349/139

(58) Field of Classification Search
USPC ........................... 349/12, 139, 96–9; 345/173
See application file for complete search history.

(56) References Cited

U.S. PATENT DOCUMENTS

| | | | | |
|---|---|---|---|---|
| 8,026,987 B2* | 9/2011 | Choo et al. | ...................... | 349/12 |
| 8,253,870 B2* | 8/2012 | Qian et al. | ...................... | 349/12 |
| 2009/0153514 A1* | 6/2009 | Jiang et al. | ..................... | 345/173 |

* cited by examiner

*Primary Examiner* — Dung Nguyen
(74) *Attorney, Agent, or Firm* — Altis & Wispro Law Group, Inc.

(57) ABSTRACT

A display device includes a common substrate having a first surface and an opposite second surface, a first transparent conductive layer, at least one first electrode, and at least one second electrode. The first transparent conductive layer is positioned on the first surface. The at least one first electrode and the at least one second electrode are on the first surface and electrically connected to the first transparent conductive layer. The display device further includes a second transparent conductive layer, a first alignment layer, a liquid crystal layer, a second alignment layer, a thin film transistor panel, and a polarizer all stacked on each other in sequence along a direction from the first surface to the second surface of the common substrate. The second transparent conductive layer is positioned on the second surface of the common substrate.

19 Claims, 4 Drawing Sheets

DISPLAY DEVICE

CROSS-REFERENCE TO RELATED APPLICATIONS

This application claims all benefits accruing under 35 U.S.C. §119 from China Patent Application No. 201010201274.9, filed on Jun. 15, 2010, in the China Intellectual Property Office, the disclosure of which is incorporated herein by reference. The application is also related to copending application entitled, "DISPLAY DEVICE", U.S. patent application Ser. No. 12/894,498, filed Sep. 30, 2010.

BACKGROUND

1. Technical Field

The present disclosure relates to display devices and, particularly, to a display device, which combines a carbon nanotube based touch panel with a liquid crystal display screen.

2. Description of Related Art

Liquid crystal displays (LCDs) are typically used as the display in various devices such as computers and vehicle and airplane instrumentation. Following the advancement in recent years of various electronic apparatuses toward high performance and diversification, there has been continuous growth in the number of electronic apparatuses equipped with optically transparent touch panels at the front of their respective display devices (e.g., liquid crystal panels). Users may operate a touch panel by pressing or touching the touch panel with a finger, a pen, a stylus, or a tool while visually observing the liquid crystal display through the touch panel. Therefore, a demand exists for touch panels that are superior in visibility and reliable in operation.

Resistive, capacitive, infrared, and surface acoustic wave touch panels have been developed. Capacitive touch panels are widely applied because of the high accuracy and low cost of production.

A conventional display device usually has a conventional touch panel attached to a conventional liquid crystal display through double-coated tapes. However, the volume and weight of the conventional touch panel adversely increases the entire volume and weight of the conventional display device.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
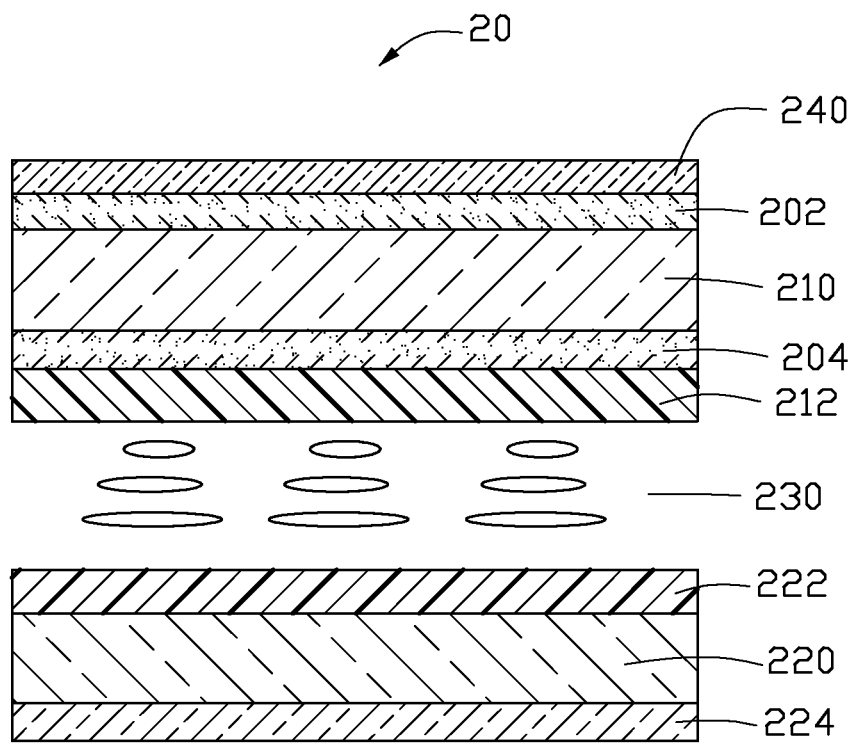
FIG. 1 is a schematic cross-section of an embodiment of a display device.
Figure 2:
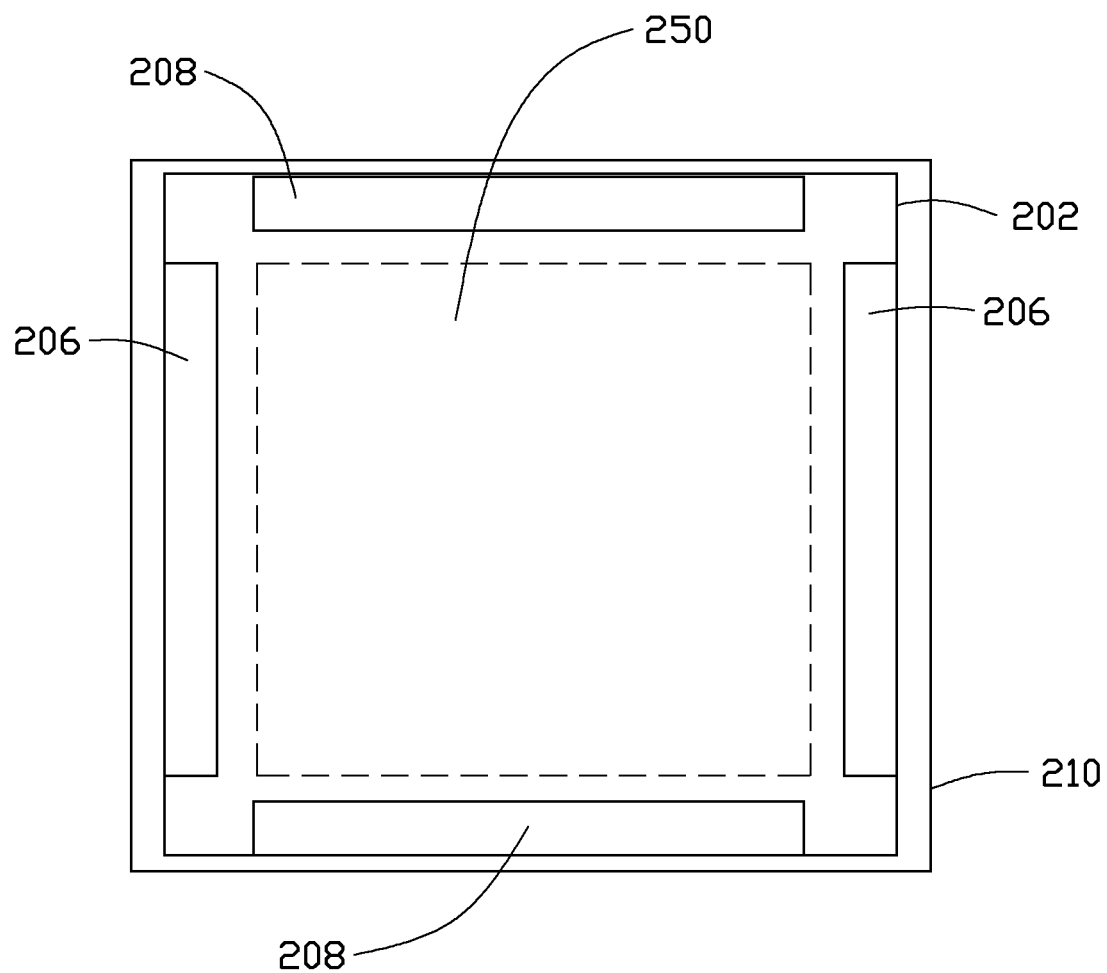
FIG. 2 is a schematic top view of the display device of FIG. 1.

Referring to FIG. 1 and FIG. 2, one embodiment of a display device 20 includes a touch panel and a liquid crystal display screen, which shares components with the touch panel.

In one embodiment, the touch panel can be a single-touch capacitive touch panel. The single-touch capacitive touch panel can include a common substrate 210, a first transparent conductive layer 202, at least one first electrode 206, and at least one second electrode 208. The first transparent conductive layer 202 has good light transmittance.

As shown in FIG. 1 and FIG. 2, the first transparent conductive layer 202, the first electrode 206, and the second electrode 208 are positioned on a top surface of the common substrate 210. The first electrode 206 and the second electrode 208 are electrically connected with the first transparent conductive layer 202. The first electrode 206 is positioned on one side of the first transparent conductive layer 202 along a first direction. The second electrode 208 is positioned on another side of the first transparent conductive layer 202 along a second direction. The first direction can be substantially perpendicular to the second direction.

In some embodiments, the single-touch capacitive touch panel can include two first electrodes 206 and two second electrodes 208. The first electrodes 206 and the second electrodes 208 can be alternatively arranged at corners or sides of the first transparent conductive layer 202. In the embodiment shown in FIG. 2, the two first electrodes 206 are positioned on opposite sides of the first transparent conductive layer 202 along the first direction. The two second electrodes 208 are positioned on other opposite sides of the first transparent conductive layer 202 along the second direction. A touch region 250 is formed at the area of the first transparent conductive layer 202, which is surrounded by the first electrodes 206 and the second electrodes 208.

The liquid crystal display screen shares the common substrate 210 with the above described touch panel. The liquid crystal display screen can further include a second transparent conductive layer 204, a first alignment layer 212, a liquid crystal layer 230, a second alignment layer 222, a thin film transistor panel 220, and a second polarizer 224.

The second transparent conductive layer 204 is positioned on a lower surface of the common substrate 210. The first alignment layer 212 is positioned on a lower surface of the second transparent conductive layer 204. The second alignment layer 222 is positioned on an upper surface of the thin film transistor panel 220 and opposite to the first alignment layer 212. The liquid crystal layer 230 is positioned between the first alignment layer 212 and the second alignment layer 222. The second polarizer 224 is positioned on a lower surface of the thin film transistor panel 220.

The common substrate 210 can be used as a base of the single-touch capacitive touch panel and as an upper substrate of the liquid crystal display screen. The second transparent conductive layer 204 can be used as an upper electrode of the liquid crystal display screen to apply a voltage to the liquid crystal layer 230, and as a first polarizer of the liquid crystal display screen to polarize light beams. Thus, the display device 20 can be thin, simply structured, and low cost.

In some embodiments, the first transparent conductive layer 202 can be a first carbon nanotube layer. The first carbon nanotube layer can include a plurality of carbon nanotubes. In some embodiments, the first carbon nanotube layer can be a substantially pure structure composed of the carbon nanotubes.

In one embodiment, the carbon nanotubes of the first carbon nanotube layer can be disorderly arranged. The term 'disordered carbon nanotube layer' refers to a structure where the carbon nanotubes can be arranged along different directions, and the aligning directions of the carbon nanotubes can be random. The number of the carbon nanotubes arranged along each different direction can be almost the same (e.g. uniformly disordered). The disordered carbon nanotube layer can be isotropic, namely the disordered carbon nanotube layer has properties identical in all directions of the disordered carbon nanotube layer. The carbon nanotubes in the disordered carbon nanotube layer can be entangled with each other.

In one embodiment, the carbon nanotubes of the first carbon nanotube layer can be orderly arranged. Some of the carbon nanotubes of the first carbon nanotube layer can be arranged approximately along the first direction. The rest of the carbon nanotubes of the first carbon nanotube layer can be arranged approximately along the second direction. By such design, the first carbon nanotube layer has relatively larger electrical conductivities along the first direction and the second direction than in other directions.

In some embodiments, the first carbon nanotube layer can include a plurality of stacked carbon nanotube drawn films, namely first carbon nanotube drawn films and second carbon nanotube drawn films. In each of the carbon nanotube drawn films, carbon nanotubes are substantially arranged along a same direction. The aligned direction of the carbon nanotubes in the first carbon nanotube drawn films is the first direction. The aligned direction of the carbon nanotubes in the second carbon nanotube drawn films is the second direction. The second carbon nanotube drawn films are stacked on the first carbon nanotube drawn films.

Figure 3:
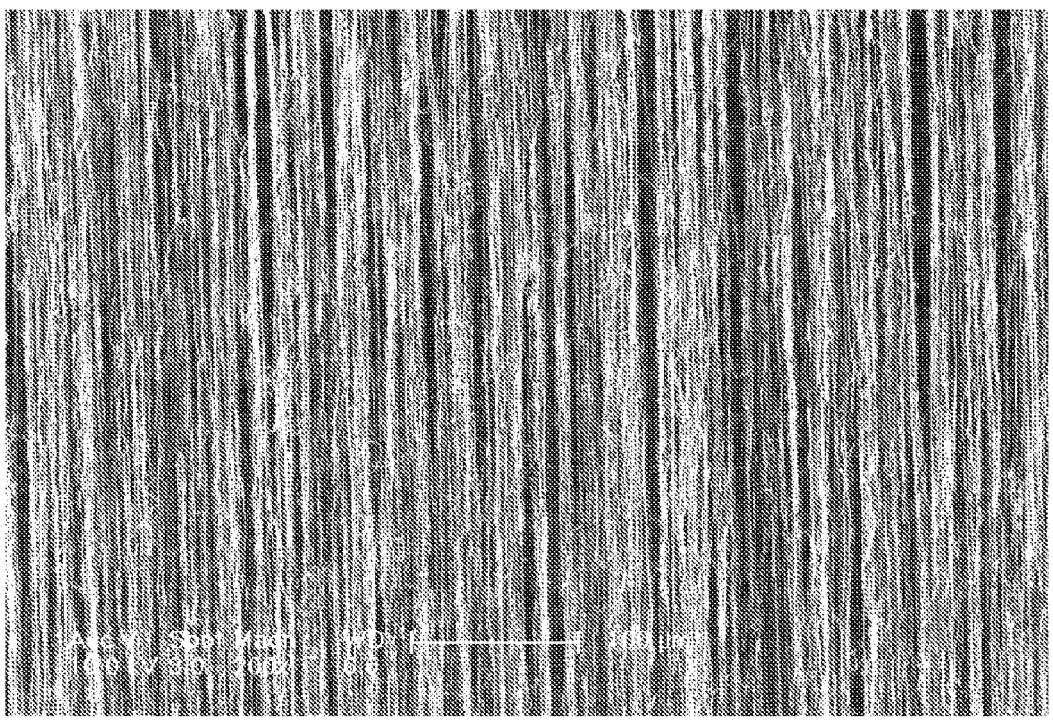
FIG. 3 shows a Scanning Electron Microscope (SEM) image of a carbon nanotube drawn film.

Referring to FIG. 3, the carbon nanotube drawn film can include a plurality of carbon nanotubes that can be arranged substantially parallel to a surface of the carbon nanotube drawn film. A large number of the carbon nanotubes in the carbon nanotube drawn film can be oriented along a preferred orientation, meaning that a large number of the carbon nanotubes in the carbon nanotube drawn film are arranged substantially along the same direction. An end of one carbon nanotube is joined to another end of an adjacent carbon nanotube arranged substantially along the same direction, by Van der Waals attractive force. A small number of the carbon nanotubes may be randomly arranged in the carbon nanotube drawn film, and has a small, if not negligible effect on the larger number of the carbon nanotubes in the carbon nanotube drawn film arranged substantially along the same direction. The carbon nanotube drawn film is capable of forming a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube drawn film is placed between two separate supporters, a portion of the carbon nanotube drawn film, not in contact with the two supporters, would be suspended between the two supporters and yet maintain film structural integrity. The free-standing structure of the carbon nanotube drawn film is realized by the successive carbon nanotubes joined end to end by Van der Waals attractive force.

It can be appreciated that some variation can occur in the orientation of the carbon nanotubes in the carbon nanotube drawn film as can be seen in FIG. 3. Microscopically, the carbon nanotubes oriented substantially along the same direction may not be perfectly aligned in a straight line, and some curve portions may exist. It can be understood that some carbon nanotubes located substantially side by side and oriented along the same direction being contact with each other can not be excluded.

Figure 4:
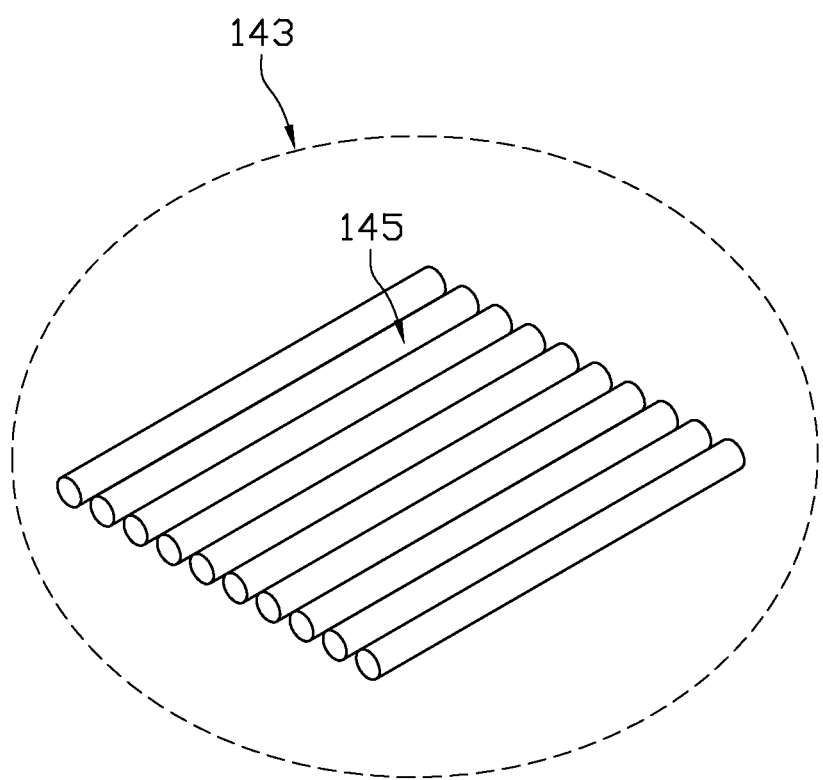
FIG. 4 is a schematic, enlarged view of a carbon nanotube segment.

More specifically, referring to FIG. 4, the carbon nanotube drawn film includes a plurality of successively oriented carbon nanotube segments 143 joined end-to-end by Van der Waals attractive force therebetween. Each carbon nanotube segment 143 includes a plurality of carbon nanotubes 145 substantially parallel to each other, and joined by Van der Waals attractive force therebetween. The carbon nanotube segments 143 can vary in width, thickness, uniformity, and shape. The carbon nanotubes 145 in the carbon nanotube drawn film are also substantially oriented along a preferred orientation.

In one embodiment, the carbon nanotube drawn film can be drawn out from an array of carbon nanotubes. The carbon nanotube drawn film can be formed by selecting one or more carbon nanotubes having a predetermined width from the array of carbon nanotubes, and pulling the carbon nanotubes at a roughly uniform speed to form carbon nanotube segments 143 that are joined end to end to achieve a uniform carbon nanotube drawn film.

The carbon nanotube segments 143 can be selected by using a tool, such as adhesive tape, plier, tweezer, or other tools allowing multiple carbon nanotubes to be gripped and pulled simultaneously to contact with the array of carbon nanotubes. Referring to FIG. 4, each carbon nanotube segment 143 includes a plurality of carbon nanotubes 145 substantially parallel to each other, and combined by Van der Waals attractive force therebetween. The pulling direction can be substantially perpendicular to the growing direction of the array of carbon nanotubes.

The drawn carbon nanotube film has the smallest electrical resistance along the pulling direction, and the largest electrical resistance along a direction substantially perpendicular to the pulling direction.

The length and width of the carbon nanotube drawn films are not limited, because the carbon nanotube drawn films can be located side by side or stacked with each other in the first carbon nanotube layer. In one embodiment, each carbon nanotube drawn film has a light transmittance greater than 85%, and the number of layers of the carbon nanotube drawn films is not limited so long as the first carbon nanotube layer has proper light transmittance.

In some embodiments, the first carbon nanotube layer includes a carbon nanotube composite film. The carbon nanotube composite film includes a carbon nanotube drawn film and polymer materials infiltrating the carbon nanotube drawn film. Spaces can exist between the adjacent carbon nanotubes in the carbon nanotube drawn film, and thus the carbon nanotube drawn film includes a number of micropores defined by the adjacent carbon nanotubes therein. The polymer material is filled into the micropores of the carbon nanotube drawn film to form the carbon nanotube composite film. The polymer materials can be distributed uniformly in the carbon nanotube composite film. The carbon nanotube composite film can include one or more carbon nanotube drawn films. The carbon nanotube composite film can have a uniform thickness. A thickness of the carbon nanotube composite film is only limited by the degree of transparency desired. In one embodiment, the thickness of the carbon nanotube composite film can range from about 0.5 nanometers to about 100 microns. The polymer material can be transparent, and not limited to a specific material. The polymer material can be polystyrene, polyethylene, polycarbonate, polymethyl methacrylate (PMMA), polycarbonate (PC), polyethylene terephthalate (PET), Benzo Cyclo Butene (BCB), or polyalkenamer. In one embodiment, the polymer material is PMMA.

In some embodiments, the first carbon nanotube layer can include at least one etched or laser-treated carbon nanotube drawn film. The etched or laser-treated carbon nanotube drawn film has an enhanced anisotropic electrical conductivity. For example, a number of cutting lines can be formed in the carbon nanotube drawn film along the aligned direction of the carbon nanotubes of the carbon nanotube drawn film.

The common substrate 210 can be a transparent plate. The common substrate 210 can be made of glass, quartz, diamond, plastic or resin. The thickness of the common substrate 210 can range from about 1 millimeter to about 1 centimeter. In one embodiment, the common substrate 210 is a PET film and the thickness of the common substrate 210 is about 2 millimeters.

The first electrodes 206 and the second electrodes 208 can include conductive materials, such as metals, conductive polymer materials, or carbon nanotubes. The metals can be gold, silver, copper or any other metal having a good conductivity. The conductive polymer materials can be polyacetylene, polyparaphenylene, polyaniline, or polythiophene. In one embodiment, the first electrodes 206 and the second electrodes 208 can be made of conductive silver pastes.

A transparent protective film 240 can be further located on the upper surface of the first transparent conductive layer 202. The material of the transparent protective film 240 can be silicon nitride, silicon dioxide, BCB, polyester, acrylic resin, PET, or any combination thereof. The transparent protective film 240 can also be a plastic film treated with surface hardening treatment. The transparent protective film 240 can reduce glare or reflection. In one embodiment, the material of the transparent protective film 240 is PET.

In the liquid crystal display screen, the second transparent conductive layer 204 can be a second carbon nanotube layer. The second carbon nanotube layer can include a plurality of carbon nanotubes substantially arranged along the first direction. In some embodiments, the second carbon nanotube layer can be a substantially pure structure consisting of the carbon nanotubes. In some embodiments, the second carbon nanotube layer can include a plurality of stacked carbon nanotube drawn films. Carbon nanotubes of the carbon nanotube drawn films of the second carbon nanotube layer are substantially arranged along the first direction. Because the carbon nanotubes of the second carbon nanotube layer are substantially arranged along the first direction, the second carbon nanotube layer can function as the first polarizer of the liquid crystal display screen to polarize light beams. The polarization direction of the second carbon nanotube layer can be substantially parallel to the second direction.

The second polarizer 224 can be made of the same material as the second transparent conductive layer 204. The material of the second polarizer 224 can be conventional polarizing material, such as dichroic organic polymer materials. In some embodiments, the material of the second polarizer 224 can be iodine material or dyestuff material. The second polarizer 224 is used to polarize the light beams emitted from the light guide plate (not shown) located on the surface of the liquid crystal display screen facing away from the thin film transistor panel 220, and thus achieving polarized light beams along a same direction. The polarization direction of the second polarizer 224 is substantially parallel to the first direction. The polarization direction of the second polarizer 224 is substantially perpendicular to the polarization direction of the second transparent conductive layer 204.

The first alignment layer 212 can include a number of substantially parallel first grooves (not shown) formed thereon. The first grooves are located on a lower surface of the first alignment layer 212 opposing the liquid crystal layer 230. The first grooves are used to make the liquid crystal molecules align along a same direction. The second alignment layer 222 can include a number of substantially parallel second grooves (not shown) formed thereon. The second grooves are located on an upper surface of the second alignment layer 222 opposing the liquid crystal layer 230.

An alignment direction of the first grooves is substantially perpendicular to an alignment direction of the second grooves. The second grooves are used to make the liquid crystal molecules align substantially along a same direction. Because the alignment direction of the first grooves is substantially perpendicular to the alignment direction of the second grooves, the alignment direction of the liquid crystal molecules differ by about 90 degrees between the first alignment layer 212 and the second alignment layer 222, which play a role of shifting the light beams polarized by the second polarizer 224 by 90 degrees.

The material of the first alignment layer 212 and the second alignment layer 222 can be polystyrenes and derivatives of the polystyrenes, polyimides, polyvinyl alcohols, polyesters, epoxy resins, polyurethanes, or other polysilanes. The first grooves and the second grooves can be formed by a rubbing method, a tilt deposition method, a micro-grooves treatment method, or a SiOx-depositing method. In one embodiment, the material of the first alignment layer 212 and the second alignment layer 222 is polyimide and a thickness thereof ranges from about 1 micrometer to about 50 micrometers.

The liquid crystal layer 230 can include a number of cigar shaped liquid crystal molecules. Understandably, the liquid crystal layer 230 can also be made of other conventional suitable materials, such as alkyl benzoic acid, alkyl cyclohexyl acid, alkyl cyclohexyl-phenol, and phenyl cyclohexane. A thickness of the liquid crystal layer 230 can range from about 1 micrometer to about 50 micrometers. In one embodiment, a thickness of the liquid crystal layer 230 is about 5 micrometers.

The detailed structure of the thin film transistor panel 220 is not shown in FIG. 1. It is to be understood that the thin film transistor panel 220 can further include a transparent base, a number of thin film transistors located on the transparent base, a number of pixel electrodes, and a display driver circuit (not shown). The thin film transistors correspond to the pixel electrodes in a one-to-one manner. The thin film transistors are connected to the display driver circuit by the source lines and gate lines. The pixel electrodes are controlled to cooperate with the second transparent conductive layer 204, to apply a voltage to the liquid crystal layer 230. The pixel electrodes correspond to the touch region 250.

In operation of the display device 20, a voltage is applied to the first transparent conductive layer 202 through the first electrodes 206 and the second electrodes 208 to form an equipotential plane on the first transparent conductive layer 202. Contact is made with the transparent protective film 240 by a contact tool (not shown), such as a finger or stylus. Due to an electrical field of the user, a coupling capacitance forms between the user and the first transparent conductive layer 202. For high frequency electrical current, the coupling capacitance electrically conducts, and thus the contact tool draws away some current from the contact point. Current through the first electrodes 206 and the second electrodes 208 cooperatively replace the current lost at the contact point. The quantity of current supplied by each of the first electrodes 206 and the second electrodes 208 is directly proportional to the distance to the contact point. Thereby, coordinates of the contact point can be detected.

As described above, the liquid crystal display screen shares the common substrate 210 with the above described touch panel. Thus, the display device 20 can be thin, simply structured, and low cost.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A display device comprising:
   a common substrate having a first surface and an opposite second surface;
   a first transparent conductive layer positioned on the first surface;
   at least one first electrode on the first surface and electrically connecting to the first transparent conductive layer;
   at least one second electrode on the first surface and electrically connecting to the first transparent conductive layer;
   a second transparent conductive layer, having a polarization direction, positioned on the second surface;
   a first alignment layer positioned on the second transparent conductive layer, such that the second transparent conductive layer is between the second surface and the first alignment layer;
   a second alignment layer spaced from and opposite to the first alignment layer;
   a liquid crystal layer located between the first alignment layer and the second alignment layer;
   a thin film transistor panel positioned on the second alignment layer, such that the second alignment layer is between the liquid crystal layer and the thin film transistor panel; and
   a polarizer positioned on the thin film transistor panel, such that the thin film transistor panel is between the polarizer and the second alignment layer, wherein the polarization direction of the polarizer is substantially perpendicular to the polarization direction of the second transparent conductive layer.

2. The display device of claim 1, wherein the first transparent conductive layer comprises a plurality of carbon nanotubes.

3. The display device of claim 2, wherein the plurality of carbon nanotubes of the first transparent conductive layer is disorderly arranged.

4. The display device of claim 2, wherein some of the plurality of carbon nanotubes of the first transparent conductive layer are arranged approximately along a first direction, and the rest of the plurality of carbon nanotubes of the first transparent conductive layer are arranged approximately along a second direction.

5. The display device of claim 4, wherein the first direction is substantially perpendicular to the second direction.

6. The display device of claim 4, wherein the second transparent conductive layer comprises a plurality of carbon nanotubes substantially arranged along the first direction.

7. The display device of claim 6, wherein the at least one first electrode comprises two first electrodes located at opposite sides of the first transparent conductive layer along the first direction; the at least one second electrode comprises two second electrodes located at opposite sides of the first transparent conductive layer along the second direction.

8. The display device of claim 1, wherein the first transparent conductive layer comprises at least one first carbon nanotube drawn film and at least one second carbon nanotube drawn film stacked on the at least one first carbon nanotube drawn film; the at least one first carbon nanotube drawn film comprises a plurality of carbon nanotubes connected by Van der Waals attractive force therebetween and substantially arranged along a first direction; the at least one second carbon nanotube drawn film comprises a plurality of carbon nanotubes connected by Van der Waals attractive force therebetween and substantially arranged along a second direction.

9. The display device of claim 8, wherein the first direction is substantially perpendicular to the second direction.

10. The display device of claim 8, wherein the second transparent conductive layer comprises at least one carbon nanotube drawn film comprising a plurality of carbon nanotubes connected by Van der Waals attractive force therebetween and substantially arranged along the first direction.

11. The display device of claim 10, wherein the at least one first electrode comprises two first electrodes located at opposite sides of the first transparent conductive layer along the first direction; the at least one second electrode comprises two second electrodes located at opposite sides of the first transparent conductive layer along the second direction.

12. The display device of claim 1, wherein the first transparent conductive layer comprises a carbon nanotube composite film which comprises at least one carbon nanotube drawn film and polymer materials infiltrating the at least one carbon nanotube drawn film.

13. The display device of claim 1, further comprising a transparent protective film positioned on the first transparent conductive layer, such that the first transparent conductive layer is located between the transparent protective film and the common substrate.

14. A display device comprising:
   a common substrate having a first surface and an opposite second surface;
   a first carbon nanotube drawn film positioned on the first surface of the common substrate, the first carbon nanotube drawn film comprising a plurality of successively oriented carbon nanotubes joined end-to-end by Van der Waals attractive force therebetween, the carbon nanotubes being substantially arranged along a first direction;
   a second carbon nanotube drawn film stacked on the first carbon nanotube drawn film, the second carbon nanotube drawn film comprising a plurality of successively oriented carbon nanotubes joined end-to-end by Van der Waals attractive force therebetween, the carbon nanotubes of the second carbon nanotube drawn film being substantially arranged along a second direction, wherein the first direction is substantially perpendicular to the second direction;
   at least one first electrode electrically connecting to the first carbon nanotube drawn film;
   at least one second electrode electrically connecting to the second carbon nanotube drawn film;
   a third carbon nanotube drawn film positioned on the second surface of the common substrate, the third carbon nanotube drawn film comprising a plurality of successively oriented carbon nanotubes joined end-to-end by Van der Waals attractive force therebetween, the carbon nanotubes of the third carbon nanotube drawn film substantially arranged along the first direction;
   a first alignment layer positioned on the third carbon nanotube drawn film;
   a liquid crystal layer;
   a second alignment layer;

a thin film transistor panel; and
a polarizer;
wherein the first alignment layer, the liquid crystal layer, the second alignment layer, the thin film transistor panel and the polarizer are stacked on each other in sequence along a direction from the first surface to the second surface of the common substrate.

15. The display device of claim 14, wherein the first alignment layer is directly positioned on the third carbon nanotube drawn film.

16. The display device of claim 15, further comprising a transparent protective film positioned on the first carbon nanotube drawn film, such that the first carbon nanotube drawn film is located between the transparent protective film and the common substrate.

17. The display device of claim 14, wherein the common substrate is made of glass, quartz, diamond, plastic, or resin.

18. The display device of claim 14, wherein the common substrate continuously extends from the first carbon nanotube drawn film to the third carbon nanotube drawn film.

19. The display device of claim 14, wherein the polarizer comprises a fourth carbon nanotube drawn film comprising a plurality of successively oriented carbon nanotubes joined end-to-end by Van der Waals attractive force therebetween, the carbon nanotubes of the fourth carbon nanotube drawn film being substantially arranged along the second direction.

* * * * *